(12) United States Patent
Lin et al.

(10) Patent No.: US 10,205,146 B2
(45) Date of Patent: Feb. 12, 2019

(54) ROD-SHAPED BATTERY ASSEMBLY AND ELECTRONIC CIGARETTE HAVING THE SAME

(71) Applicant: Guangrong Lin, Guangdong (CN)

(72) Inventors: Guangrong Lin, Guangdong (CN); Xianbin Zheng, Guangdong (CN)

(73) Assignee: Guangrong Lin, Shenzhen (CN)

( * ) Notice: Subject to any disclaimer, the term of this patent is extended or adjusted under 35 U.S.C. 154(b) by 0 days.

(21) Appl. No.: 15/513,159

(22) PCT Filed: Aug. 30, 2016

(86) PCT No.: PCT/CN2016/097432
§ 371 (c)(1),
(2) Date: Mar. 22, 2017

(87) PCT Pub. No.: WO2017/041646
PCT Pub. Date: Mar. 16, 2017

(65) Prior Publication Data
US 2017/0301898 A1     Oct. 19, 2017

(30) Foreign Application Priority Data

Sep. 10, 2015 (CN) .......................... 2015 1 0574147

(51) Int. Cl.
*H01M 2/10* (2006.01)
*H01M 2/12* (2006.01)
(Continued)

(52) U.S. Cl.
CPC ........... *H01M 2/1094* (2013.01); *A24F 47/00* (2013.01); *A24F 47/008* (2013.01); *H01M 10/425* (2013.01); *H01M 2220/30* (2013.01)

(58) Field of Classification Search
CPC .......... H01M 2/10; H01M 2/02; H01M 10/42; A24F 47/00
See application file for complete search history.

(56) References Cited

U.S. PATENT DOCUMENTS

| 2013/0032159 A1* | 2/2013 | Capuano .................. A24F 1/30 |
| | | 131/329 |
| 2014/0355969 A1 | 12/2014 | Stern |
| 2015/0164141 A1* | 6/2015 | Newton ................ A24F 47/008 |
| | | 131/329 |

FOREIGN PATENT DOCUMENTS

| CN | 103504479 A | 1/2014 |
| CN | 203646510 U | 6/2014 |

(Continued)

OTHER PUBLICATIONS

Machine Translation of: CN 103504479 A, Jiang et al., Jan. 15, 2014.*

(Continued)

*Primary Examiner* — Kenneth J Douyette

(57) ABSTRACT

The present invention discloses a rod-shaped battery assembly (001) and an electronic cigarette having the rod-shaped battery assembly (001). The rod-shaped battery assembly (001) is configured for connecting a rod-shaped vaporizer assembly (002) of an electronic cigarette and providing the rod-shaped vaporizer assembly (002) with power. The rod-shaped battery assembly (001) comprises a hollow battery tube (1), a light cap (2) sheathed in one end of the battery tube (1), and a negative pole connecting piece (3) sheathed in the other end of the battery tube (1). The battery tube (1) sheathes an air sensor (4), a circuit board (6), and a battery (7); the negative pole connecting piece (3) sheathes an electrical insulation ring (8) and a positive pole connecting piece (9). The battery tube (1) further sheathes a moisture isolation means (10).

18 Claims, 6 Drawing Sheets

(51) Int. Cl.
*A24F 47/00* (2006.01)
*H01M 10/42* (2006.01)

(56) References Cited

FOREIGN PATENT DOCUMENTS

| | | |
|---|---|---|
| CN | 204949523 U | 1/2016 |
| CN | 105455198 A | 4/2016 |

OTHER PUBLICATIONS

International Search Report of PCT Patent Application No. PCT/CN2016/097432 dated Nov. 28, 2016.

\* cited by examiner

US 10,205,146 B2

ROD-SHAPED BATTERY ASSEMBLY AND ELECTRONIC CIGARETTE HAVING THE SAME

FIELD OF THE INVENTION

This invention relates to the field of electronic cigarettes, more particularly, to a rod-shaped battery assembly and electronic cigarette having the same.

BACKGROUND OF THE INVENTION

An electronic cigarette normally uses a vaporizer to heat and vaporize the cigarette liquid solution (e-liquid) to produce vapor for users to inhale. Compared to tobacco cigarette, a lack of tobacco tars is an advantage of electronic cigarette, which reduces tobacco harm to people and gradually becomes the reason for electronic cigarettes being substitution for tobacco cigarettes on the market.

Currently, the electronic cigarettes sold on the market with replaceable or refillable e-liquid comprise a rod-shaped battery assembly, a rod-shaped vaporizer assembly and a mouthpiece. The rod-shaped vaporizer assembly comprises a vaporizer comprising a liquid-storage device and a vaporizing device, wherein the vaporizing device comprises a liquid-guiding wick and a heating coil. The rod-shaped battery assembly comprises an air sensor, a circuit board and a battery etc. The battery provides the heating coil of the vaporizer with power. After being powered, the heating coil may heat up the e-liquid drawn up by the liquid-guiding wick. The e-liquid is therefore vaporized and turns into vapor coming out of the electronic cigarette. Upon pausing smoking, the vapor in the electronic cigarettes known on the market may flows back to the rod-shaped battery assembly due to the pressure caused by the vapor lingering on in the vaporizer. Thus the moisture in the vapor may run through the air sensor and the circuit board located in the rod-shaped battery assembly and stick to them. After a period of reaction, this will cause corrosion of electronic components of the air sensor and the circuit board or cause short circuit or open circuit, which therefore gives rise to malfunction of the electronic cigarette.

SUMMARY OF THE INVENTION

On one hand, the present invention provides a rod-shaped battery assembly aiming at overcoming the above-mentioned drawbacks. Inside the rod-shaped battery assembly there is provided a moisture isolation means to confine the moisture in the vapor produced in the electronic cigarette to one side of the moisture isolation means to prevent its contact with the air sensor and the circuit board. On the other hand, the present invention aims to provide an electronic cigarette that has the rod-shaped battery assembly.

The technical solution of the present invention is a rod-shaped battery assembly configured for connecting a rod-shaped vaporizer assembly of an electronic cigarette and providing the rod-shaped vaporizer assembly with power, comprising a hollow battery tube, a light cap sheathed in one end of the battery tube, and a negative pole connecting piece sheathed in the other end of the battery tube.

The battery tube sheathes an air sensor, a circuit board, and a battery; the negative pole connecting piece sheathes an electrical insulation ring and a positive pole connecting piece; wherein the battery tube further sheathes a moisture isolation means configured for confining moisture contained in vapor produced in the electronic cigarette to one side of the moisture isolation means so as to prevent the vapor from contacting with the air sensor and the circuit board.

Preferably, the moisture isolation means is disposed between the battery and the negative pole connecting piece.

Preferably, the moisture isolation means has at least one layer of water-absorbable breathable material configured for absorbing the moisture contained in the vapor.

Preferably, the moisture isolation means comprises a one-way valve which opens when the air comes in running through the air sensor and the circuit board to the negative pole connecting piece and closes the otherwise.

Preferably, the moisture isolation means comprises a cylinder that is closed at its one end and open at its other end; an external diameter of the cylinder is equivalent to an internal diameter of the battery tube; a middle portion of a bottom wall of the cylinder tapers to the open end of the cylinder to form a cone; a top of the cone has an air hole for air coming through; and the top of the cone faces the negative pole connecting piece.

Preferably, the moisture isolation means comprises a cylinder that is closed at its one end and open at its other end; an external diameter of the cylinder is equivalent to an internal diameter of the battery tube; a bottom wall of the cylinder has a plurality of air holes; and the water-absorbable breathable material is filled in the cylinder.

Preferably, the moisture isolation means comprises a cylinder that is closed at its one end and open at its other end; an external diameter of the cylinder is equivalent to an internal diameter of the battery tube; a center of a bottom wall of the cylinder is provided with an air hole; the one-way valve is located inside the cylinder and faces the air hole; the one-way valve comprises at least two guide pillars each having a longitudinal axis parallel with a central axis of the air hole, a valve plate being able to move along the longitudinal axis of the guide pillar, and a retractable coil spring sheathing the guide pillar; the retractable coil spring is able to abut the valve plate against the air hole.

Preferably, the moisture isolation means comprises a cylinder that is closed at its one end and open at its other end; an external diameter of the cylinder is equivalent to an internal diameter of the battery tube; a non-center area of a bottom wall of the cylinder is provided with a plurality of air holes; the one-way valve is a flexible diaphragm whose edge extends as a tubular body perpendicular to a surface of the closed end of the cylinder, and the tubular body is sheathed in the cylinder; the diaphragm is inwardly concaved and shaped as a dome with its top approaching the closed end of the cylinder; a center of the top of the diaphragm has a cross-shaped cracking.

Preferably, a peripheral area of the bottom wall of the cylinder is provided with a ring-shaped platform having at least two protruding stages thereon, two wire passing holes are provided in the platform between two protruding stages.

The present invention has a moisture isolation means positioned in the rod-shaped battery assembly. When the vapor produced in the rod-shaped vaporizer assembly flows back and meets the moisture isolation means, the moisture contained in the vapor will be confined to one side of the moisture isolation means to prevent the contact between the moisture and the air sensor and the circuit board. This further prevents the moisture causing corrosion of electronic components of the air sensor and the circuit board or causing short circuit or open circuit, which therefore gives rise to malfunction of the electronic cigarette.

Figure 1:
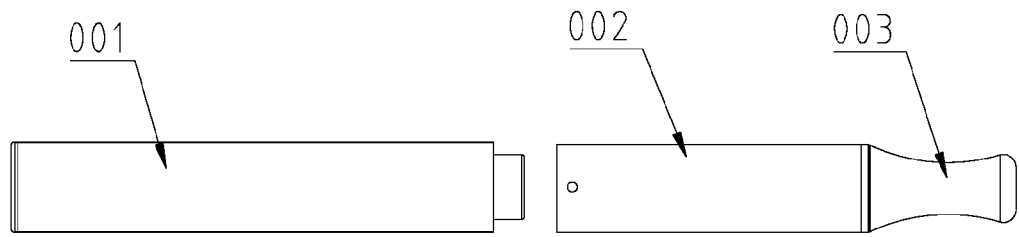
FIG. 1 is a schematic view of an electronic cigarette of the present invention.

LIST OF REFERENCE NUMERALS 001. rod-shaped battery assembly
002. rod-shaped vaporizer assembly
003. mouthpiece
1. battery tube
2. light cap
3. negative pole connecting piece
31. connector
32. screw threads
4. air sensor
5. air sensor holder
6. circuit board
7. battery
8. electrical insulation ring
9. positive pole connecting piece
91. central hole
10. moisture isolation means
101. cylinder
102. cone
103. air hole
104. platform
105. protruding stage
106. wire passing hole
107. water-absorbable breathable material
108. one-way valve
1081. guide pillar
1082. valve plate
1083. retractable coil spring
109. diaphragm
1091. tubular body
1092. cross-shaped cracking

DETAILED DESCRIPTION OF THE ILLUSTRATED EMBODIMENTS

Embodiments of the present invention are further explained clearly as follows in conjunction with figures.

Embodiment 1

As shown in FIG. 1, an electronic cigarette of the present invention comprises a rod-shaped battery assembly 001, a rod-shaped vaporizer assembly 002 and a mouthpiece 003. The rod-shaped battery assembly 001 is configured for connecting the rod-shaped vaporizer assembly 002 of the electronic cigarette and providing the rod-shaped vaporizer assembly 002 with power. The rod-shaped vaporizer assembly 002 is used for heating and vaporizing the e-liquid to produce vapor. The rod-shaped vaporizer assembly 002 comprises a liquid-storage device holding the e-liquid and a vaporizing device (not shown in the figure). The vaporizing device comprises a liquid-guiding wick and a heating coil, wherein the liquid-guiding wick draws up the e-liquid from the liquid-storage device and directs it to the heating coil, and the heating coil then heats and vaporizes the e-liquid thus produces vapor.

Figure 2:
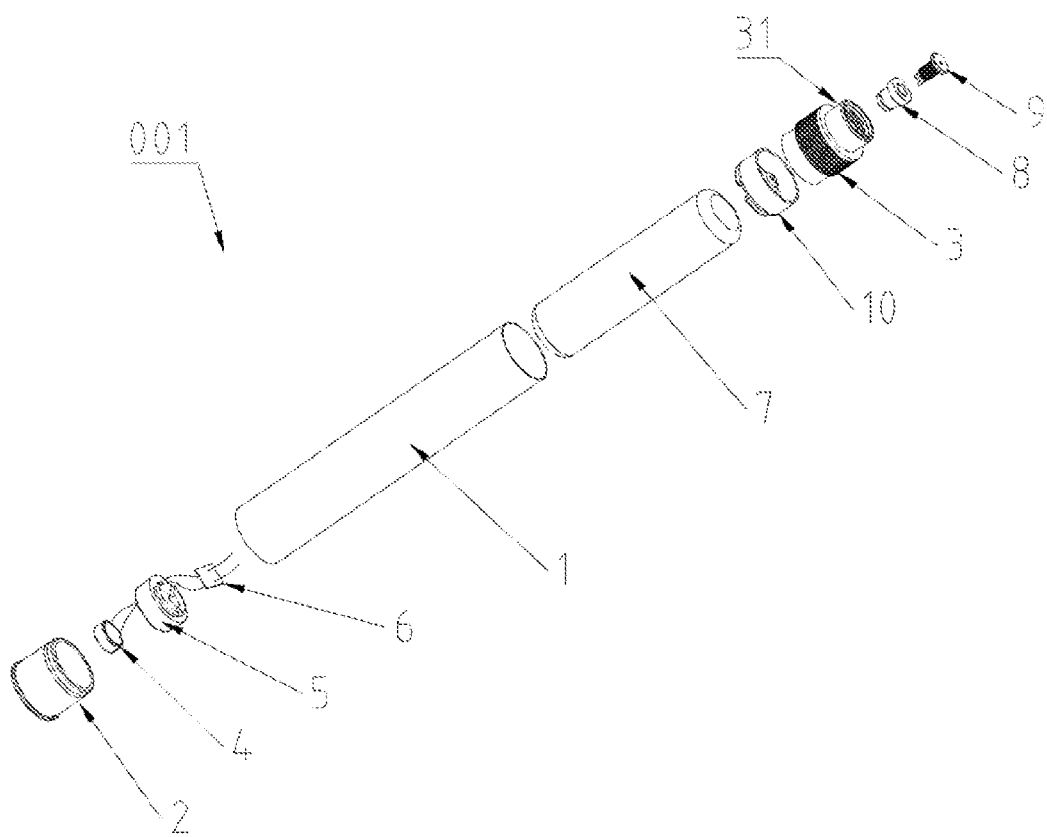
FIG. 2 is an exploded view of a rod-shaped battery assembly according to a first embodiment of the present invention.

As shown in FIG. 2, the rod-shaped battery assembly 001 in embodiment 1 of the present invention comprises a hollow battery tube 1, a light cap 2 sheathed in an end of the battery tube 1, and a negative pole connecting piece 3 sheathed in the other end of the battery tube 1. The battery tube 1 sheathes an air sensor 4, an air sensor holder 5, a circuit board 6, a battery 7 and a moisture isolation means 10. The negative pole connecting piece 3 sheathes an electrical insulation ring 8 and a positive pole connecting piece 9.

Figure 3:
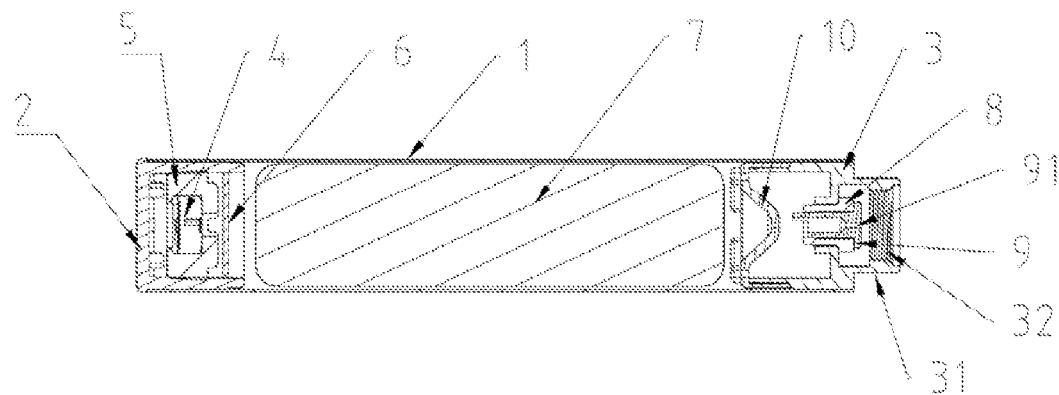
FIG. 3 is a cross-sectional view of the rod-shaped battery assembly according to the first embodiment of the present invention.
Figure 4:
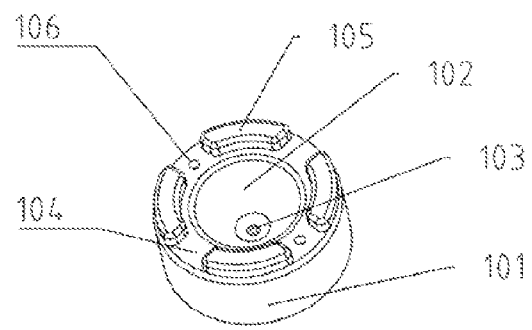
FIG. 4 is perspective view of a moisture isolation means according to the first embodiment of the present invention.
Figure 5:
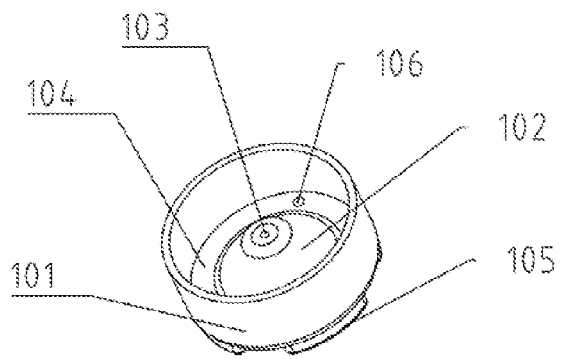
FIG. 5 is another perspective view of the moisture isolation means shown in FIG. 4 according to the first embodiment of the present invention.

As shown in FIGS. 2 and 3, the air sensor holder 5 is disposed for positioning the air sensor 4, wherein the air sensor 4 is used for detecting airflow in the rod-shaped battery assembly 001. When users inhale by sucking the mouthpiece 003, the pressure in the rod-shaped vaporizer assembly 002 decreases, which gives rise to some air flowing in through an air inlet (not shown in the figures) positioned at the light cap 2. The entered air runs through the interior of the rod-shaped battery assembly 001 and flows out to the rod-shaped vaporizer assembly through a central hole 91 of the positive pole connecting piece 9 at the other end of the battery tube 1. During the air flow process, the air sensor 4 detects the air running past it and sends a signal to the circuit board 6 that then controls the battery 7 to electrify the heating coil (not shown in the figures) disposed in the rod-shaped vaporizer assembly 002, therefore the e-liquid held in the electronic cigarette is vaporized to create vapor. Upon pausing smoking, no air flow is detected by the air sensor 4 since the air is no longer coming in, which causes the circuit board 6 to stop electrifying the heating coil thus stop creating vapor.

As shown in FIGS. 2 and 3, a first end of the negative pole connecting piece 3 is sheathed in the battery tube 1, a second end of the negative pole connecting piece 3 is provided with a connector 31 that has screw threads 32, via which the rod-shaped battery assembly 001 and the rod-shaped vaporizer assembly 002 are connected. Besides the screw threads 32, other connecting means may also be used. The negative pole connecting piece 3 which is made of metal is used as a negative pole for connecting a negative pole of the battery 7 controlled by the circuit board 6. At a center of the negative pole connecting piece 3 there is positioned the positive pole connecting piece 9 which is also made of metal. The electrical insulation ring 8 that is made of insulating material is placed between the negative pole connecting piece and the positive pole connecting piece to prevent short circuit. The positive pole connecting piece 9, which has the central hole 91 placed at its center to allow the airflow, is connected to a positive pole of the battery 7 controlled by the circuit board 6. After the connector 31 has been connected to the rod-shaped vaporizer assembly 002, the negative pole connecting piece 3 and the positive pole connecting piece 9 are respectively electrically connected to a negative pole and a positive pole of the heating coil of the rod-shaped vaporizer assembly 002.

As shown in FIGS. 2, 3, 4 and 5, the moisture isolation means 10 is arranged between the battery 7 and the negative pole connecting piece 3. The moisture isolation means 10 is made of silicone and comprises a cylinder 101 that is closed at its one end and open at its other end. An external diameter of the cylinder 101 is equivalent to an internal diameter of the battery tube 1 so that the cylinder 101 is rightly sheathed in the battery tube 1. The open end of the cylinder 101 faces the negative pole connecting piece 3 and an internal wall of the cylinder 101 sheathes the first end of the negative pole connecting piece 3 so as to give a stronger fixation for the moisture isolation means 10. A middle portion of the closed end (i.e., a bottom wall of the cylinder 101) of the cylinder 101 tapers to the open end of the cylinder 101 thus to form a cone 102, wherein a top of the cone faces the negative pole connecting piece 3 and has an air hole 103 for air coming through. A peripheral area of the bottom wall of the cylinder 101 is provided with a ring-shaped platform 104. The platform 104 is provided with four protruding stages 105 thereon. There are spaces between every two protruding stages 105 to define a free air passage between the protruding stages 105 and the battery 7 after they are abutted against each other. Two wire passing holes 106 are provided in the platform 104 for wires passing through, each wire passing hole 106 is arranged between two protruding stages 105. In the moisture isolation means 10, a bottom of the cone 102 faces the battery 7. When smoking, air comes in through the air inlet of the light cap 2 and runs within the battery tube 1 getting past the air hole 103 located at the top of the cone 102 and then past the central hole 91 of the positive pole connecting piece 9 all the way to the rod-shaped vaporizer assembly 002. Upon pausing smoking, the existing pressure in the rod-shaped vaporizer assembly 002 may push the residual vapor to flow back to the rod-shaped battery assembly 001 through the central hole 91 of positive pole connecting piece 9. In response, an exterior surface of the cone 102 and an interior surface of the cylinder 101 of the moisture isolation means 10 together with the negative pole connecting piece 3 form a space to stall the backflow, therefore confine the moisture contained in the vapor to the space and condense it into droplets on the exterior surface of the cone 102. This prevents the moisture contained in the vapor running past the interior of the rod-shaped battery assembly 001 through the air hole 103, contacting and condensing on the battery 7, circuit board 6 and the air sensor 4; and it further prevents the moisture causing corrosion of the air sensor 4 and the circuit board 6 or causing short circuit or open circuit and ultimately prevents malfunction of the electronic cigarette.

Embodiment 2

This embodiment contains a different moisture isolation means 10 from embodiment 1 where the rest technical solution of the present embodiment is of the same parts.

Figure 6:
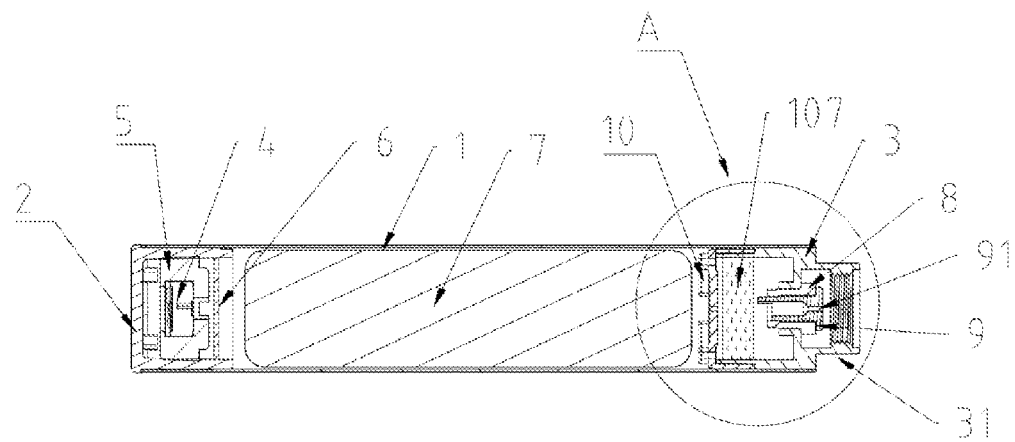
FIG. 6 is a cross-sectional view of a rod-shaped battery assembly according to a second embodiment of the present invention.
Figure 7:
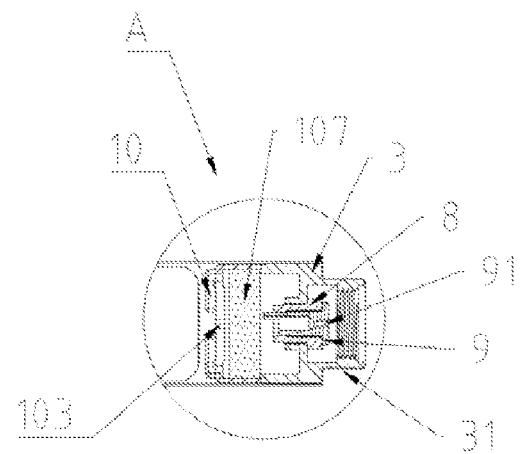
FIG. 7 is an enlarged view of part A of the rod-shaped battery assembly shown in FIG. 6 according to the second embodiment of the present invention.

As shown in FIG. 6, a moisture isolation means 10 located in the rod-shaped battery assembly 001 in the present embodiment can absorb the moisture contained in the vapor. A layer of water-absorbable breathable material 107 that can on one hand absorb the moisture and on the other hand allow air to pass through is provided inside the moisture isolation means 10, wherein the material may be sponge, charcoal etc. The moisture is absorbed by this layer of water-absorbable breathable material 107 as it permeates the material. It is detailed in FIG. 7 that the moisture isolation means 10 comprises a cylinder 101 that is closed at its one end and open at its other end. An external diameter of the cylinder 101 is equivalent to an internal diameter of the battery tube 1, and a bottom wall of cylinder 101 (i.e., the closed end of the cylinder 101) is provided with a plurality of air holes 103. The water-absorbable breathable material 107 is filled in the cylinder 101. When the vapor leaves the rod-shaped vaporizer assembly 002 and runs through the central hole 91 of the positive pole connecting piece 9 and flows back in the moisture isolation means 10, the moisture contained in the vapor is thus absorbed by the water-absorbable breathable material 107. This prevents the moisture entering the rod-shaped battery assembly 001 through the air holes 103, contacting and condensing on the battery 7, the circuit board 6 and the air sensor 4; and further prevents the moisture causing corrosion the air sensor 4 and the circuit board 6 or causing short circuit or open circuit and ultimately prevents malfunction of the electronic cigarette.

Figure 8:
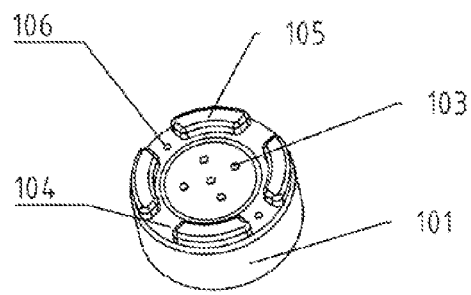
FIG. 8 is a perspective view of a moisture isolation means according to the second embodiment of the present invention.

As shown in FIG. 8, a peripheral area of the bottom wall of the cylinder 101 of the moisture isolation means 10 is provided with a ring-shaped platform 104. The platform 104 is provided with four protruding stages 105 thereon. There are spaces between every two protruding stages 105 to define a free air passage between the protruding stages 105 and the battery 7 after they are abutted against each other. Two wire passing holes 106 are provided in the platform 104 for wires passing through, each wire passing hole 106 is arranged between two protruding stages 105. Said plurality of air holes 103 at the bottom wall of the cylinder 101 is configured for allowing the vapor to permeate the water-absorbable breathable material 107 equally and the moisture contained in the vapor to be fully absorbed.

The water-absorbable breathable material 107 in the moisture isolation means 10 in the present embodiment is replaceable after it absorbs enough moisture. This can be done by adjusting and improving the structure of the rod-shaped battery assembly so that the moisture isolation means 10 can be removed easily and the water-absorbable breathable material 107 can be replaced.

Embodiment 3

This embodiment contains a different moisture isolation means 10 from embodiment 1 where the rest technical solution of the present embodiment is of the same parts.

Figure 9:
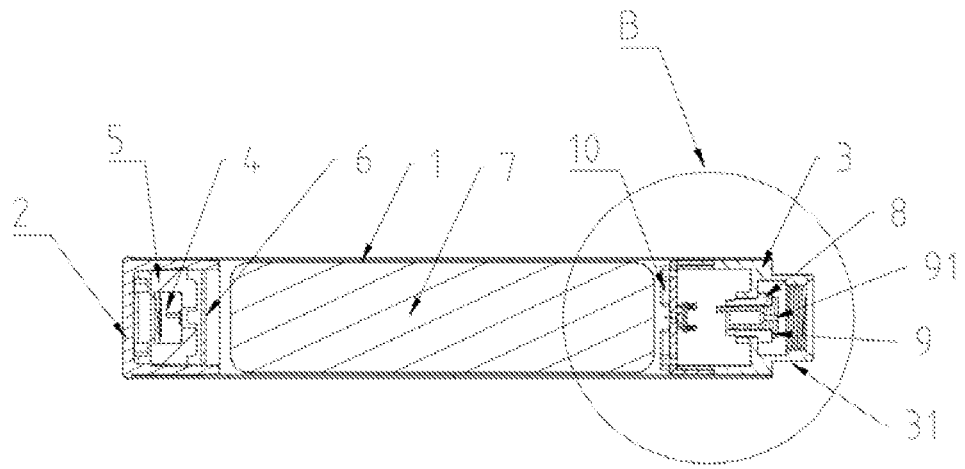
FIG. 9 is a cross-sectional view of a rod-shaped battery assembly according to a third embodiment of the present invention.
Figure 10:
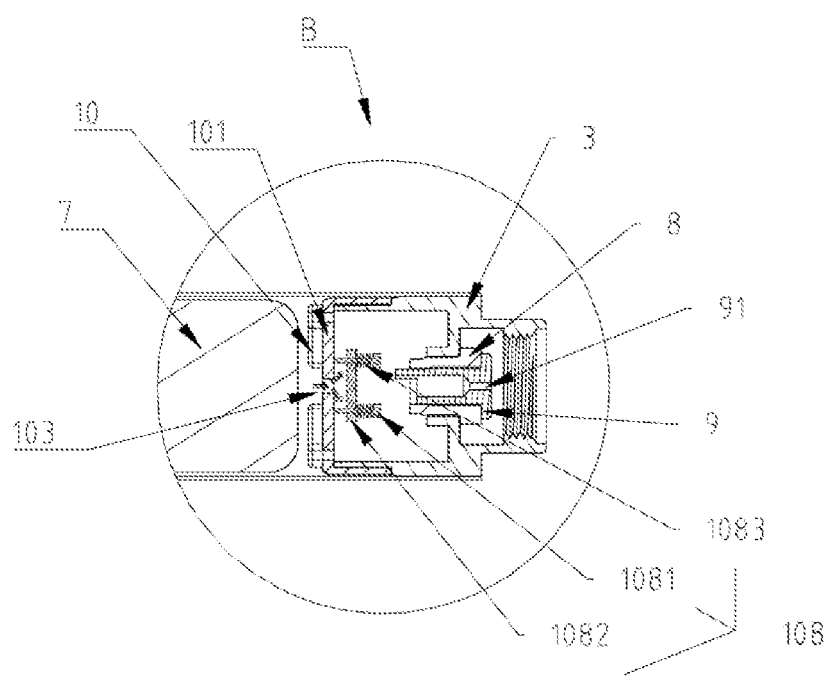
FIG. 10 is an enlarged view of part B of the rod-shaped battery assembly shown in FIG. 9 according to the third embodiment of the present invention.

As shown in FIGS. 9 and 10, a moisture isolation means 10 positioned in the rod-shaped battery assembly 001 in the present embodiment uses a one-way valve. The one-way valve 108 opens when the air comes in running through the air sensor 4 and the circuit board 6 to the negative pole connecting piece 3 and closes the otherwise. It is detailed in FIG. 10 that the moisture isolation means 10, which comprises a cylinder 101 that is closed at its one end and open at its other end, is arranged between the battery 7 and the negative pole connecting piece 3. The external diameter of the cylinder 101 is equivalent to the internal diameter of the battery tube 1. At a center of a bottom wall of the cylinder 101 (i.e., the closed end of the cylinder 101) there is provided with an air hole 103. Inside the cylinder 101, the one-way valve 108 is arranged at a side of the air hole 103 and faces the air hole 103. The one-way valve 108 comprises two guide pillars 1081 standing beside the air hole 103 and having longitudinal axes parallel with a central axis of the air hole 103, a valve plate 1082 being able to move along the longitudinal axes of the guide pillars, and two retractable coil springs 1083 each arranged between a top of the guide pillar 1081 and the valve plate 1082 and sheathing the guide pillar 1081. When smoking, the pressure in the rod-shaped vaporizer assembly 002 decreases and so does the pressure at a side of the moisture isolation means 10 that is far away from the battery 7. The air, after being detected, thus comes in and runs through the battery 7 all the way to the moisture isolation means 10. The detected air then reaches the air hole 103, pushes forward the valve plate 1082 and passes through the one-way valve 108. Upon pausing smoking, the air stops running. The valve plate 1082 then bounces back due to the elasticity of the retractable coil spring 1083 and tightly presses against the bottom wall of the cylinder 101; the air hole 103 is thus plugged. When the vapor left in the rod-shaped vaporizer assembly 002 flows back, due to a lack of a push, the retractable coil spring 1083 still keeps the valve plate 1082 onto the closed end and the air hole 103 therefore stays plugged. This prevents the vapor from entering the air sensor 4 and the circuit board 6 and confines the moisture contained in the vapor to the side of the moisture isolation means 10 that is far away from the battery 7; this further prevents the moisture causing corrosion of the air sensor 4 and the circuit board 6 or causing short circuit or open circuit and ultimately prevents malfunction of the electronic cigarette.

Figure 11:
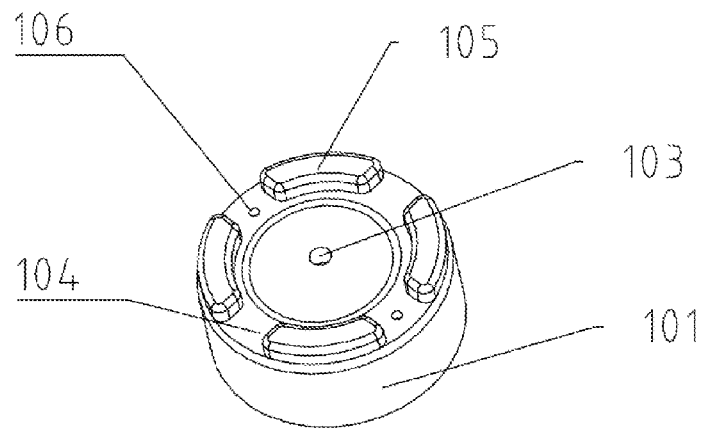
FIG. 11 is a perspective view of a moisture isolation means according to the third embodiment of the present invention.

As shown in FIG. 11, a peripheral area of the bottom wall of the cylinder 101 of the moisture isolation means 10 is provided with a ring-shaped platform 104. The platform 104 is provided with four protruding stages 105 thereon. There are spaces between every two protruding stages 105 to define a free air passage between the protruding stages 105 and the battery 7 after they are abutted against each other. Two wire passing holes 106 are provided in the platform 104 for wires passing through, each wire passing hole 106 is arranged between two protruding stages 105. The air hole 103 is opened in the center of the bottom wall of cylinder 101.

Embodiment 4

This embodiment contains a different moisture isolation means 10 from embodiment 1, where the rest technical solution of the present embodiment is of the same parts.

Figure 12:
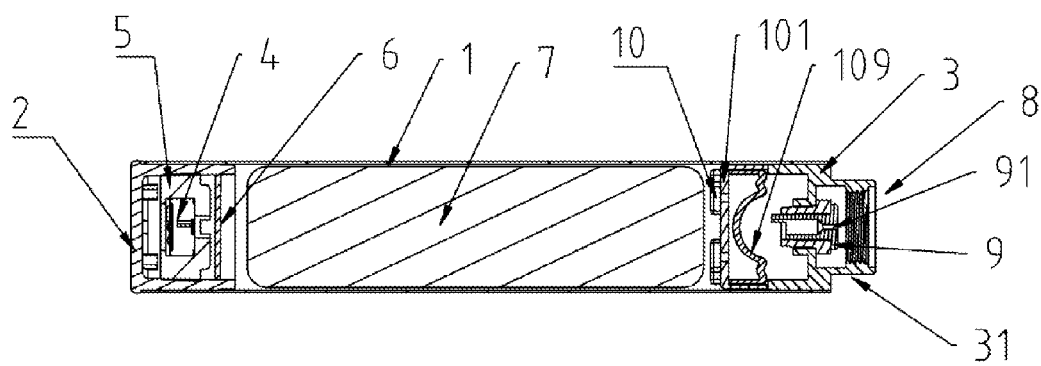
FIG. 12 is a cross-sectional view of a rod-shaped battery assembly according to a fourth embodiment of the present invention.

As shown in FIG. 12, a moisture isolation means 10 positioned in the rod-shaped battery assembly 001 in the present embodiment also adopts a one-way valve. The one-way valve is a flexible diaphragm 109 that may be made of elastic silicone, rubber, or plastic material. The diaphragm 109 opens when the air comes in running through the air sensor 4 and the circuit board 6 to the negative pole connecting piece 3 and closes the otherwise.

It is detailed in FIG. 1 and FIGS. 12-16 that the moisture isolation means 10, comprising a cylinder 101 that is closed at its one end and open at its other end, is arranged between the battery 7 and the negative pole connecting piece 3. The external diameter of the cylinder 101 is equivalent to the internal diameter of the battery tube 1; and at a non-center area of a bottom wall of the cylinder 101 (i.e., the closed end of the cylinder 101) there is provided with eight air holes 103 positioned as a ring. An edge of the flexible diaphragm 109 extends as a tubular body 1091 perpendicularly to a surface of the closed end of the cylinder 101, the tubular body 1091 is sheathed with an inner wall of the cylinder 101. The diaphragm 109 is inwardly concaved and shaped as a dome with its top approaching the closed end of the cylinder 101. At a center of the top of the diaphragm, there is provided with a cross-shaped cracking 1092. According to FIG. 12, when smoking, the pressure in the rod-shaped vaporizer assembly 002 decreases and so does the pressure at a side of the moisture isolation means 10 that is far away from the battery 7. The air, after being detected, thus comes in and runs through the battery 7 all the way to the moisture isolation means 10. The detected air then reaches the air holes 103, pushes forward the diaphragm 109, breaks through the cross-shaped cracking 1092 and passes through the diaphragm 109. Upon pausing smoking, the air stops running. The diaphragm 109 then closes as the cross-shaped cracking 1092 restores to where it was. When the vapor left in the rod-shaped vaporizer assembly 002 flows back, it imposes pressure on the cross-shaped cracking 1092 of the diaphragm 109. However the diaphragm 109 stays closed by virtue of the closed end of the cylinder 101 resisting it from moving further. The vapor is thus denied access to the rod-shaped battery assembly 001 by running through the cross-shaped cracking 1092 and the air holes 103. This prevents the vapor from entering the air sensor 4 and the circuit board 6 and confines the moisture contained in the vapor to the side of the moisture isolation means 10 that is far away from the battery 7; this further prevents the moisture causing corrosion of the air sensor 4 and the circuit board 6 or causing short circuit or open circuit and ultimately prevents malfunction of the electronic cigarette.

Figure 13:
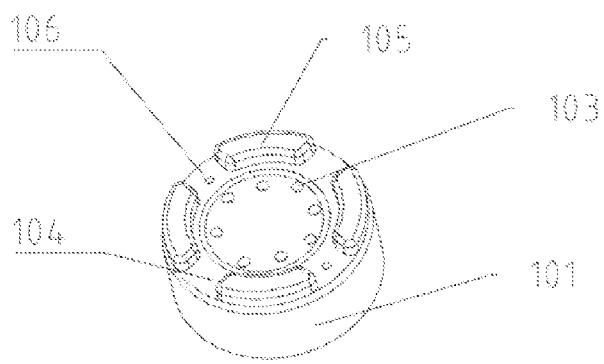
FIG. 13 is a perspective view of a moisture isolation means according to the fourth embodiment of the present invention.
Figure 14:
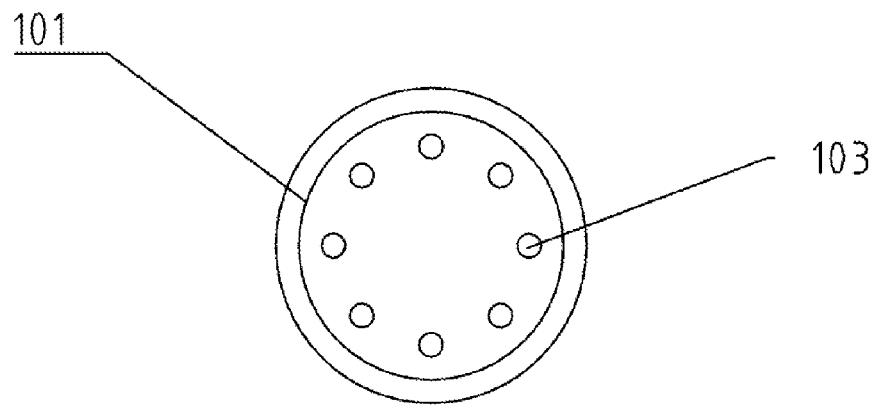
FIG. 14 is a bottom view of the moisture isolation means shown in FIG. 13 according to the fourth embodiment of the present invention, the bottom view of the moisture isolation means showing an interior view of the moisture isolation means.
Figure 15:
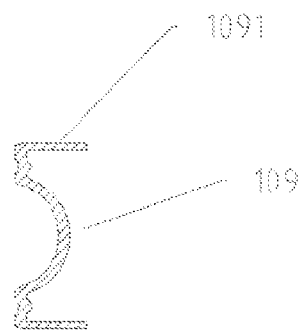
FIG. 15 is a cross-sectional view of a diaphragm according to the fourth embodiment of the present invention.
Figure 16:
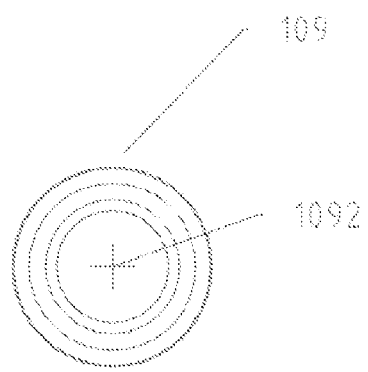
FIG. 16 is a front view of the diaphragm according to the fourth embodiment of the present invention.

As shown in FIG. 13, a peripheral area of the bottom wall of the cylinder 101 of the moisture isolation means 10 is provided with a ring-shaped platform 104. The platform 104 is provided with four protruding stages 105 thereon. There are spaces between every two protruding stages 105 to define a free air passage between the protruding stages 105 and the battery 7 after they are abutted against each other. Two wire passing holes 106 are provided in the platform 104 for wires passing through, each wire passing hole 106 is arranged between two protruding stages 105.

The one-way valve of the moisture isolation means in the rod-shaped battery assembly in the present invention may be replaced by various kinds, for example, a cone with a pinball arranged at its air hole, a retractable spring etc. Such possible substitutions are not enumerated herein.

The improvement of the rod-shaped battery assembly in the present invention is that the moisture isolation means of the present invention may be implemented in such disposable electronic cigarettes that do not need change or refill of e-liquid. In a disposable electronic cigarette, the rod-shaped battery assembly, the rod-shaped vaporizer assembly and the mouthpiece are formed as a whole, and the negative pole connecting piece, the electrical insulation ring and the positive pole connecting piece can be left out. The moisture isolation means disposed in the rod-shaped battery assembly in the present invention may also be disposed between the circuit board, the air sensor and the vaporizer in a disposable electronic cigarette so as to protect the circuit board and the air sensor from corrosion.

The above-mentioned embodiments are the preferred embodiments of the present invention and are considered in all respects as illustrative and not restrictive. Variations and modifications are allowed within the scope of the invention. Those skilled in the art will appreciate that the features described above can be combined in various ways to form multiple variations of the invention. As a result, such variations fall within the scope of the protection to the present invention.

What is claimed is:

1. A rod-shaped battery assembly configured for connecting a rod-shaped vaporizer assembly of an electronic cigarette and providing the rod-shaped vaporizer assembly with power, comprising a hollow battery tube, a light cap sheathed in one end of the battery tube, and a negative pole connecting piece sheathed in another end of the battery tube;
the battery tube sheathing an air sensor, a circuit board, and a battery;
the negative pole connecting piece sheathing an electrical insulation ring and a positive pole connecting piece;
characterized in that the battery tube further sheathes a moisture isolation means configured for confining moisture contained in vapor produced in the electronic cigarette to one side of the moisture isolation means so as to prevent the vapor from contacting with the air sensor and the circuit board;
the moisture isolation means comprises a cylinder that is closed at its one end and open at its other end; an external diameter of the cylinder is equivalent to an internal diameter of the battery tube; a middle portion of a bottom wall of the cylinder tapers to the open end of the cylinder to form a cone; a top of the cone has an air hole for air coming through; and the top of the cone faces the negative pole connecting piece;
a peripheral area of the bottom wall of the cylinder is provided with a ring-shaped platform having at least two protruding stages thereon, two wire passing holes are provided in the platform between two protruding stages.

2. The rod-shaped battery assembly according to claim 1, characterized in that the moisture isolation means is disposed between the battery and the negative pole connecting piece.

3. The rod-shaped battery assembly according to claim 1, characterized in that the moisture isolation means has at least one layer of water-absorbable breathable material configured for absorbing the moisture contained in the vapor.

4. The rod-shaped battery assembly according to claim 1, characterized in that the moisture isolation means comprises a one-way valve which opens when the air comes in running through the air sensor and the circuit board to the negative pole connecting piece and closes the otherwise.

5. The rod-shaped battery assembly according to claim 3, characterized in that the moisture isolation means comprises a cylinder that is closed at its one end and open at its other end; an external diameter of the cylinder is equivalent to an internal diameter of the battery tube; a bottom wall of the cylinder has a plurality of air holes; and the water-absorbable breathable material is filled in the cylinder;
a peripheral area of the bottom wall of the cylinder is provided with a ring-shaped platform having at least two protruding stages thereon, two wire passing holes are provided in the platform between two protruding stages.

6. The rod-shaped battery assembly according to claim 4, characterized in that the moisture isolation means comprises a cylinder that is closed at its one end and open at its other end; an external diameter of the cylinder is equivalent to an internal diameter of the battery tube; a center of a bottom wall of the cylinder is provided with an air hole; the one-way valve is located inside the cylinder and faces the air hole; the one-way valve comprises at least two guide pillars each having a longitudinal axis parallel with a central axis of the air hole, a valve plate being able to move along the longitudinal axis of the guide pillar, and a retractable coil spring sheathing the guide pillar; the retractable coil spring is able to abut the valve plate against the air hole.

7. The rod-shaped battery assembly according to claim 4, characterized in that the moisture isolation means comprises a cylinder that is closed at its one end and open at its other end; an external diameter of the cylinder is equivalent to an internal diameter of the battery tube; a non-center area of a bottom wall of the cylinder is provided with a plurality of air holes; the one-way valve is a flexible diaphragm whose edge extends as a tubular body perpendicular to a surface of the closed end of the cylinder, and the tubular body is sheathed in the cylinder; the diaphragm is inwardly concaved and shaped as a dome with its top approaching the closed end of the cylinder; a center of the top of the diaphragm has a cross-shaped cracking.

8. The rod-shaped battery assembly according to claim 6, characterized in that a peripheral area of the bottom wall of the cylinder is provided with a ring-shaped platform having at least two protruding stages thereon, two wire passing holes are provided in the platform between two protruding stages.

9. An electronic cigarette comprising the rod-shaped battery assembly according to claim 1.

10. The rod-shaped battery assembly according to claim 7, characterized in that a peripheral area of the bottom wall of the cylinder is provided with a ring-shaped platform having at least two protruding stages thereon, two wire passing holes are provided in the platform between two protruding stages.

11. An electronic cigarette comprising the rod-shaped battery assembly according to claim 2.

12. An electronic cigarette comprising the rod-shaped battery assembly according to claim 3.

13. An electronic cigarette comprising the rod-shaped battery assembly according to claim 4.

14. An electronic cigarette comprising the rod-shaped battery assembly according to claim 5.

15. An electronic cigarette comprising the rod-shaped battery assembly according to claim 6.

16. An electronic cigarette comprising the rod-shaped battery assembly according to claim 7.

17. An electronic cigarette comprising the rod-shaped battery assembly according to claim 8.

18. An electronic cigarette comprising the rod-shaped battery assembly according to claim 10.

* * * * *